United States Patent [19]

Iwami et al.

[11] Patent Number: 5,857,056
[45] Date of Patent: Jan. 5, 1999

[54] INFORMATION RECORDING AND REPRODUCING APPARATUS

[75] Inventors: Sousuke Iwami, Yokohama; Hiroshi Nishiyama, Kanagawa-ken, both of Japan

[73] Assignee: Victor Company of Japan, Ltd., Yokohama, Japan

[21] Appl. No.: 679,625

[22] Filed: Jul. 12, 1996

[30] Foreign Application Priority Data

Jul. 14, 1995 [JP] Japan .................................. 7-201470

[51] Int. Cl.$^6$ .............................. H04N 11/02; H04N 5/91
[52] U.S. Cl. ............................................ 386/33; 386/101
[58] Field of Search .............................. 386/101, 96, 98, 386/102, 40, 104, 38, 1, 27, 31, 39, 33; H04N 11/02, 5/91

[56] References Cited

U.S. PATENT DOCUMENTS

| 4,777,537 | 10/1988 | Ueno et al. | 386/96 |
| 5,083,212 | 1/1992 | Owa et al. | 386/101 |
| 5,249,052 | 9/1993 | Yoshimura et al. | 386/101 |

FOREIGN PATENT DOCUMENTS

| 0287316 | 10/1988 | European Pat. Off. . |
| 0398423 | 11/1990 | European Pat. Off. . |
| 52-47616 | 4/1977 | Japan . |
| 4212594 | 8/1992 | Japan . |

OTHER PUBLICATIONS

NHK Laboratories Note, No. 423, 1 Mar. 1994, pp. 1–17, XP000451479 Koji Kamijo et al: "An Experimental Compact Hi–Vision VCR Using Metal Evaporated Tape".

Funkchau, No. 25, 4 Dec. 1987, pp. 42–46, XP002026213 Güttner et al.: "Losgelöst von Normen".

Funkschau, No. 18, 25 Aug. 1989, pp. S44–S46, S48, XP000053648 Kays R et al: "Video Mit Dem Feinen Bild".

Primary Examiner—Robert Chevalier
Attorney, Agent, or Firm—Pollock, Vande Sande & Amernick

[57] ABSTRACT

In a recording and reproducing apparatus, a digital luminance signal and digital color difference signals generated from an input video signal. A digital audio signal is generated from an input audio signal. The digital luminance signal, the digital color difference signals, and the digital audio signal are time-base-compressed into a compression-resultant luminance signal, compression-resultant color difference signals, and a compression-resultant audio signal, respectively. The compression-resultant luminance signal, the compression-resultant color difference signals, and the compression-resultant audio signal are multiplexed into a multiplexing-resultant signal on a time-division-multiplexing basis. The multiplexing-resultant signal is recorded on a recording medium. The multiplexing-resultant signal is reproduced from the recording medium. The original digital luminance signal, the original digital color difference signals, and the original digital audio signal are recovered from the reproduced multiplexing-resultant signal.

6 Claims, 6 Drawing Sheets

INFORMATION RECORDING AND REPRODUCING APPARATUS

BACKGROUND OF THE INVENTION

1. Field of the Invention

This invention relates to an information recording apparatus, an information reproducing apparatus, and an information recording and reproducing apparatus.

2. Description of the Prior Art

Some compact recording and reproducing apparatus have a body on which a television camera is integrally provided. Further, the body can accommodate a cassette containing a magnetic tape. Generally, the television camera has a solid-state photoelectric converting section, that is, a solid-state imager. During operation of such an information recording and reproducing apparatus, a video signal outputted from a television camera is recorded on a magnetic tape. At the same time, an audio signal outputted from a microphone is recorded on the magnetic tape.

SUMMARY OF THE INVENTION

It is a first object of this invention to provide an improved information recording apparatus.

It is a second object of this invention to provide an improved information reproducing apparatus.

It is a third object of this invention to provide an improved information recording and reproducing apparatus.

A first aspect of this invention provides a recording and reproducing apparatus comprising first means for generating a digital luminance signal and digital color difference signals from an input video signal. A second means generates a digital audio signal from an input audio signal. A third means time-base-compresses the digital luminance signal and the digital color difference signals generated by the first means into a compression-resultant luminance signal and compression-resultant color difference signals, and which time-base-compresses the digital audio signal generated by the second meads into a compression-resultant audio signal. The compression-resultant luminance signal, the compression-resultant color difference signals, and the compression-resultant audio signal are multiplexed into a multiplexing-resultant signal on a time-division-multiplexing basis. A fourth means records the multiplexing-resultant signal generated by the third means on a recording medium. A fifth means reproduces the multiplexing-resultant signal from the recording medium. A sixth means recovers the original digital luminance signal, the original digital color difference signals, and the original digital audio signal from the multiplexing-resultant signal reproduced by the fifth means.

A second aspect of this invention provides a recording and reproducing apparatus comprising a camera having a solid-state imager for converting a scene of an object into a corresponding video signal. A first means generates a digital luminance signal and digital color difference signals from the video signal generated by the camera. A microphone converts the sound into a corresponding audio signal and a second means converts the audio signal generated by the microphone into a corresponding digital audio signal. A third means time-base-compresses the digital luminance signal and the digital color difference signals generated by the first means into a compression-resultant luminance signal and compression-resultant color difference signals, and time-base-compresses the digital audio signal generated by the second means into a compression-resultant audio signal. A sync signal, the compression-resultant luminance signal, the compression-resultant color difference signals, and the compression-resultant audio signal are multiplexed into a multiplexing-resultant signal on a time-division-multiplexing basis. The compression-resultant luminance signal, the compression-resultant color difference signals, and the compression-resultant audio signal are present in periods except horizontal and vertical blanking periods while the sync signal is present in the horizontal and vertical blanking periods. A fourth means records the multiplexing-resultant signal generated by the third means on a magnetic tape along inclined tracks (slant tracks). A fifth means reproduces the multiplexing-resultant signal from the inclined tracks on the magnetic tape. A sixth means detects the sync signal in the multiplexing-resultant signal reproduced by the fifth means, for separating the compression-resultant luminance signal, the compression-resultant color difference signals, and the compression-resultant audio signal from the reproduced multiplexing-resultant signal in response to the detected sync signal, and expands the separated compression-resultant luminance signal, the separated compression-resultant color difference signals, and the separated compression-resultant audio signal to recover the original digital luminance signal, the original digital color difference signals, and the original digital audio signal 5 respectively.

A third aspect of this invention is based on the second aspect thereof, and provides a recording and reproducing apparatus wherein the fourth means comprises means for subjecting the multiplexing-resultant signal to frequency modulation to convert the multiplexing-resultant signal into a corresponding modulation-resultant signal, and means for recording the modulation-resultant signal on the magnetic tape.

A fourth aspect of this invention provides a recording and reproducing apparatus having a body on which a camera is integrally provided, the camera having a solid-state imager and converting a scene of an object into a corresponding video signal. The apparatus comprises a first A/D converter for converting the video signal generated by the camera into a corresponding digital video signal. A first signal processor including a first memory separates the digital video signal generated by the first A/D converter into a digital luminance signal and digital color difference signals by using the first memory. A microphone converts the sound into a corresponding audio signal. A switch selects one of a reproduced signal and the audio signal generated by the microphone, and produces the selected signal and a second A/D converter converts the output signal of the switch into a corresponding digital signal in response to a sampling clock signal having a frequency equal to or higher than twice a maximum frequency of a video signal. A filter decimates the digital signal generated by the second A/D converter. A second signal processor including a second memory and subjects the digital signal generated by the second A/D converter to time-base variation correction and noise reduction by using the second memory when the digital signal generated bay the second A/D converter represents a reproduced signal. A clock signal generator produces a clock signal on the basis of a reproduced signal and feeds the produced clock signal to the second A/D converter as the sampling clock signal during playback, the produced clock signal being synchronous with a time-base variation in the reproduced signal. The clock signal generator supplies the produced clock signal to the second memory as a write clock signal. A third signal processor time-base-compresses the digital luminance signal and the digital color difference signals generated by the first signal processor into a compression-resultant luminance signal and compression-resultant color difference signals, and time-base-compresses a digital audio signal outputs d from the filter into a compression-resultant audio signal. The third signal processor multiplexes a sync signal, the compression-resultant luminance signal, the compression-resultant color difference signals, and the compression-resultant audio signal into a multiplexing-resultant signal on a time-division-multiplexing basis during recording. The compression-resultant luminance signal, the compression-resultant color difference signals, and the compression-resultant audio signal are present in periods except horizontal and vertical blanking periods while the sync signal is present in the horizontal and vertical blanking periods. The third signal processor is operative for detecting a sync signal in a reproduced multiplexing-resultant signal fed via the second signal processor, and separates a compression-resultant luminance signal, compression-resultant color difference signals, and a compression—resultant audio signal from the reproduced multiplexing-resultant signal in response to the detected sync signal, and expands the separated compression-resultant luminance signal, the separated compression-resultant color difference signals, and the separated compression-resultant audio signal into a recovered digital luminance signal, recovered digital color difference signals, and a recovered digital audio signal respectively during playback. A D/A converter converts the multiplexing-resultant signal generated by the third signal processor into a corresponding digital multiplexing-resultant signal. A modulator subjects the digital multiplexing-resultant signal generated by the D/A converter to modulation to convert the digital multiplexing-resultant signal into a corresponding modulation-resultant signal. A first means records the modulation-resultant signal generated by the modulator on a magnetic tape along inclined tracks (slant tracks) and a second means reproduces the modulation-resultant signal from the magnetic tape. A demodulator demodulates the modulation-resultant signal reproduced by the second means into a reproduced signal, and outputs the reproduced signal to the clock signal generator and the switch. An encoder encodes the recovered digital color difference signals generated by the third signal processor into a carrier color signal. A third means generates a reproduced composite video signal from the recovered digital luminance signal generated by the third signal processor and the carrier color signal generated by the encoder. A fourth means generates a reproduced audio signal from the recovered digital audio signal generated by the third signal processor.

A fifth aspect of this invention is based on the fourth aspect thereof, and provides a recording and reproducing apparatus further comprising a second clock signal generator for producing clock signals synchronous with each other, wherein the first A/D converter, the second A/D converter, the filter, the D/A converter, the first signal processor, the encoder, and the first means respond to the respective clock signals produced by the second clock signal generator.

A sixth aspect of this invention is based on the fourth aspect thereof, and provides a recording and reproducing apparatus wherein the first means and the second means comprise a rotary drum, and a single common magnetic head mounted on the rotary drum. The magnetic tape is wound on the rotary drum in an angular range less than 360 degrees. The modulation-resultant signal applied to the magnetic head corresponds to a vertical blanking period when the magnetic head does not scan the magnetic tape, and the second means replaces the reproduced modulation-resultant signal by a given signal during a vertical blanking period.

A seventh aspect of this invention is based on the fourth aspect thereof, and provides a recording and reproducing apparatus wherein the third signal processor superimposes a burst signal on the multiplexing-resultant signal, and the burst signal is present in the horizontal and vertical blanking periods. A second filter is provided for separating a burst signal from the reproduced signal generated by the demodulator and feeding the separated burst signal to the clock signal generator. A fifth means maintains an amplitude of the burst signal separated by the second filter at a given amplitude.

An eighth aspect of this invention is based on the fourth aspect thereof, and provides a recording and reproducing apparatus wherein the decimating by the filter has a period equal to a horizontal readout period in the solid-state imager, and a sampling timing of the decimating is in a horizontal blanking period during readout operation of the solid-state imager.

A ninth aspect of this invention is based on the fourth aspect thereof, and provides a recording and reproducing apparatus wherein the first memory and the second memory comprise a common memory.

A tenth aspect of this invention provides a recording and reproducing apparatus comprising a first means for converting an input analog video signal into a corresponding digital video signal. A second means separates the digital video signal generated by the first means into a digital luminance signal and a digital carrier color signals. A third means converts an input analog audio signal into a corresponding digital audio signal. An encoder/decoder converts the digital carrier color signal generated by the second means into digital color difference signals during recording by converting input digital color difference signals into a digital carrier color signal during playback. A fourth means time-base-compresses the digital luminance signal generated by the second means into a compression-resultant luminance signal, for time-base-compressing the digital color difference signals generated by the encoder/decoder into compression-resultant color difference signals, time-base-compresses the digital audio signal generated by the ,third means into a compression-resultant audio signal, and multiplexes a sync signal, the compression-resultant luminance signal, the compression-resultant color difference signals, and the compression-resultant audio signal into a multiplexing-resultant signal on a time-division-multiplexing basis. The compression-resultant luminance signal, the compression-resultant color difference signals, and the compression-resultant audio signal are present in periods except horizontal and vertical blanking periods while the sync signal is present in the horizontal and vertical blanking periods. A fifth means records multiplexing-resultant signal generated by the fourth means on a magnetic tape along inclined tracks (slant tracks). A sixth means reproduces the multiplexing-resultant signal from the inclined tracks on the magnetic tape; seventh means for detecting the sync signal in the multiplexing-resultant signal reproduced by the sixth means, for separating the compression-resultant luminance signal, the compression-resultant color difference signals, and the compression-resultant audio signal from the reproduced multiplexing-resultant signal in response to the detected sync signal, and for expanding the separated compression-resultant luminance signal, the separated compression-resultant color difference signals, and the separated compression-resultant audio signal to recover the original digital luminance signal, the original digital color difference signals, and the original digital audio signal respectively. The recovered digital color difference signals are fed to the encoder/decoder, and an adder combines the digital carrier color signal generated by the encoder/decoder and the recovered digital luminance signal generated by the seventh means to form a reproduced digital composite video signal. Eight means generates a reproduced audio signal from the recovered digital audio signal generated by the seventh means.

An eleventh aspect of this invention provides a recording apparatus comprising a camera having a solid-state imager and converting a scene of an object into a corresponding video signal. A first means generates a digital luminance signal and digital color difference signals from the video signal generated by the camera. A microphone converts sound into a corresponding audio signal and a second means converts the audio signal generated by the microphone into a corresponding digital audio signal. A third means time-base-compresses the digital luminance signal and the digital color difference signals generated by the first means into a compression-resultant luminance signal and compression-resultant color difference signals, time-compresses the digital audio signal generated by the second means into a compression-resultant audio signal, and multiplexes a sync signal, the compression-resultant luminance signal, the compression-resultant color difference signals, and the compression-resultant audio signal into a multiplexing-resultant signal on a time-division-multiplexing basis, so that the compression-resultant luminance signal, the compression-resultant color difference signals, and the compression-resultant audio signal are present in periods except horizontal and vertical blanking periods while the sync signal is present in the horizontal and vertical blanking periods. A fourth means records the multiplexing-resultant signal generated by the third means on a magnetic tape along inclined tracks (slant tracks).

A twelfth aspect of this invention provides a recording apparatus comprising a first means for converting an Input analog video signal into a corresponding digital video signal. A second means separates the digital video signal generated by the first means into a digital luminance signal and a digital carrier color signal and a third means converts an input analog audio signal into a corresponding digital audio signal. An encoder converts the digital carrier color signal generated by the second means into digital color difference signals. A fourth means time-base-compresses the digital luminance signal generated by the second means into a compression-resultant luminance signal time-base-compresses the digital color difference signals generated by the encoder into compression-resultant color difference signals time-base-compresses the digital audio signal generated by the third means into a compression-resultant audio signal, and multiplexes a sync signal, the compression-resultant luminance signal, the compression-resultant color difference signals, and the compression-resultant audio signal into a multiplexing-resultant signal on a time-division-multiplexing basis. This results in the compression-resultant luminance signal, the compression-resultant color difference signals, and the compression-resultant audio signal being present in periods except horizontal and vertical blanking periods while the sync signal is present in the horizontal and vertical blanking periods. A fifth means records the multiplexing-resultant signal generated by the fourth means on a magnetic tape along inclined tracks (slant tracks).

A thirteenth aspect of this invention provides a reproducing apparatus comprising first means for reproducing a multiplexing-resultant signal from inclined tracks (slant tracks) on a magnetic tape. A second means detects a sync signal in the multiplexing-resultant signal reproduced by the first means, separates a compression-resultant luminance signal, compression-resultant color difference signals, and a compression-resultant audio signal from the reproduced multiplexing-resultant signal in response to the detected sync signal, and expands the separated compression-resultant luminance signal, the separated compression-resultant color difference signals, and the separated compression-resultant audio signal into an original-time-base recovered digital luminance signal, original-time-base recovered digital color difference signals, and an original-time-base recovered digital audio signal respectively. A third means generates a reproduced digital composite video signal from the recovered digital luminance signal and the recovered digital color difference signals generated by the second means; and fourth means generates a reproduced audio signal from the recovered digital audio signal generated by the second means.

DESCRIPTION OF THE PREFERRED EMBODIMENTS

For a better understanding of this invention, a description will now be given of a prior-art information recording and reproducing apparatus having a body on which a television camera is integrally provided.

Figure 1:
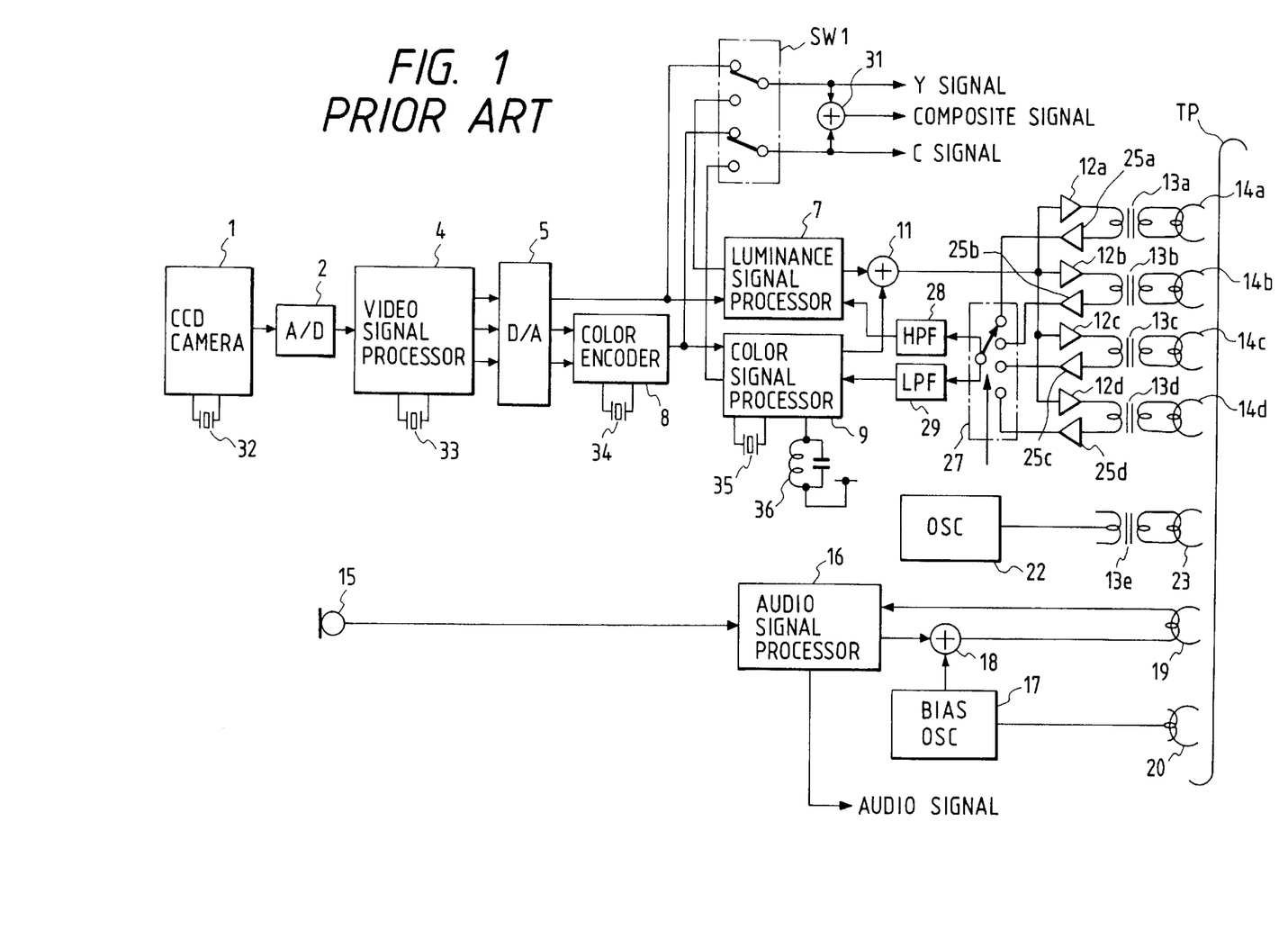
FIG. 1 is a block diagram of a prior-art information recording and reproducing apparatus.

With reference to FIG. 1, the prior-art apparatus includes a CCD (charge-coupled device) camera portion 1 which has an objective lens, a photosensor CCD array, an auto-focusing device, a readout drive circuit, and others. Light representing an image of an object is applied via the objective lens to the photosensor CCD array. The applied light is subjected to photoelectric conversion by the photosensor CCD array. The image of the object is changed into a corresponding electric video signal by the photosensor CCD array and the readout drive circuit.

In the prior-art apparatus of FIG. 1, an A/D converter 2 receives the video signal from the CCD camera portion 1. The A/D converter 2 changes the video signal into a corresponding digital video signal. A video signal processor 4 receives the digital video signal from the A/D converter 2. The video signal processor 4 separates the digital video signal into a digital luminance signal (a digital Y signal) and two digital color difference signals (digital R-Y and B-Y signals). A D/A converter 5 receives the digital luminance signal and the digital color difference signals from the video signal processor 4. The D/A converter 5 changes the digital luminance signal and the digital color difference signals into a corresponding analog luminance signal (a Y signal) and corresponding analog color difference signals respectively.

In the prior-art apparatus of FIG. 1, a luminance signal processor 7 receives the analog luminance signal from the D/A converter 5. The luminance signal processor 7 subjects the analog luminance signal to frequency modulation (FM). Thus, the luminance signal processor 7 converts the analog luminance signal into an FM luminance signal.

In the prior-art apparatus of FIG. 1, a color encoder 8 receives the analog color difference signals from the D/A converter 5. The color encoder 8 modulates a color subcarrier in accordance with the analog color difference signals or in accordance with chrominance signals generated from the analog color difference signals. The modulation implemented by the color encoder 8 is suppressed carrier orthogonal (quadrature) modulation. Thus, the color encoder 8 converts the analog color difference signals into a carrier color signal (a C signal).

In the prior-art apparatus of FIG. 1, the analog luminance signal (the Y signal) can be transmitted from the D/A converter 5 to a monitoring device (not shown) via a switch SW1. Also, the carrier color signal (the C signal) can be transmitted from the color encoder 8 to the monitoring device (not shown) via the switch SW1. An adder 31 following the switch SW1 combines the analog luminance signal and the carrier color signal into a composite television signal of the standard format such as the NTSC format. The composite television signal can be transmitted from the adder 31 to the monitoring device (not shown) or an external device (not shown).

In the prior-art apparatus of FIG. 1, a color signal processor 9 receives the carrier color signal from the color encoder 8. The color signal processor 9 subjects the carrier color signal to frequency down conversion. Thus, the color signal processor 9 changes the carrier color signal into a corresponding frequency down-converted color signal in a frequency band lower than the frequency band of the FM luminance signal. An adder 11 receives the frequency-down-converted color signal from the color signal processor 9. Also, the adder 11 receives the FM luminance signal from the luminance signal processor 7. The adder 11 combines the frequency-down-converted color signal and the FM luminance signal into a composite video signal on a frequency division multiplexing basis. The composite video signal agrees with a frequency division multiplexed signal. The composite video signal is fed from the adder 11 to magnetic heads 14a, 14b, 14c, and 14d via recording amplifiers 12a, 12b, 12c, and 12d and rotary transformers 13a, 13b, 13c, and 13d before being recorded on a magnetic tape TP by the magnetic heads 14a, 14b, 14c, and 14d. The magnetic heads 14a, 14b, 14c, and 14d are mounted on a rotary drum (not shown).

During the recording of the composite video signal on the magnetic tape TP, one magnetic head is sequentially and cyclically selected out of the magnetic heads 14a, 14b, 14c, and 14d as an actually-used magnetic head at a period corresponding to one field. The magnetic tape TP is formed with signal recording tracks having a pattern conforming to the VHS format.

The prior-art apparatus of FIG. 1 has a microphone 15 which converts sound into an audio signal. An audio signal processor 16 receives the audio signal from the microphone 15. The audio signal processor 16 amplifies the audio signal, and outputs the amplification-resultant audio signal to an adder 18. A bias oscillation circuit 17 outputs a bias voltage to the adder 18. The adder 18 combines the audio signal and the bias voltage into a bias-added audio signal. The bias-added audio signal is fed from the adder 18 to a magnetic head 19 before being recorded on the magnetic tape TP by the magnetic head 19. The recording of the bias-added audio signal on the magnetic tape TP is simultaneous with the recording of the composite video signal thereon.

In the prior-art apparatus of FIG. 1, the bias oscillation circuit 17 feeds an erasing signal to a magnetic head 20. The erasing signal has a given frequency. During the recording of the bias-added audio signal on the magnetic tape TP by the magnetic head 19, the magnetic head 20 precedes the magnetic head 19 and erases a previously-recorded audio signal from the magnetic tape TP in response to the erasing signal. An oscillation circuit 22 for flying erasion feeds an erasing signal to a magnetic head 23 via a rotary transformer 13e. The magnetic head 23 can erase a previously-recorded video signal from the magnetic tape TP in response to the erasing signal.

The prior-art apparatus of FIG. 1 implements reproduction or playback as follows. The magnetic heads 14a, 14b, 14c, and 14d reproduce composite video signals from tracks on a magnetic tape TP. The reproduced composite video signals are transmitted from the magnetic heads 14a, 14b, 14c, and 14d to preamplifiers 25a, 25b, 25c, and 25d via the rotary transformers 13a, 13b, 13c, and 13d, respectively. The devices 25a, 25b, 25c, and 25d amplify the reproduced composite video signals respectively, and output the amplification-resultant composite video signals to a switch 27. The switch 27 sequentially and cyclically selects one out of the amplification-resultant composite video signals in response to a rectangular waveform signal synchronous with rotation of the rotary drum. The switch 27 transmits the selected composite video signal to a high pass filter 28 and a low pass filter 29.

The high pass filter 28 separates an FM luminance signal from the composite video signal. The high pass filter 28 outputs the FM luminance signal to the luminance signal processor 7. The low pass filter 29 separates a frequency-down-converted color signal (a color under signal) from the composite video signal. The low pass filter 29 outputs the frequency-down-converted color signal to the color signal processor 9. The luminance signal processor 7 subjects the FM luminance signal to FM demodulation, thereby converting the FM luminance signal into a reproduced luminance signal. The color signal processor 9 subjects the frequency-down-converted color signal to frequency up conversion, thereby changing the frequency-down-converted color signal into a reproduced carrier color signal in a frequency band equal to the related original frequency band.

In the prior-art apparatus of FIG. 1, the reproduced luminance signal (the reproduced Y signal) can be transmitted from the luminance signal processor 7 to the monitoring device (not shown) or an external device (not shown) via the switch SW1. Also, the reproduced carrier color signal (the reproduced C signal) can be transmitted from the color signal processor 9 to the monitoring device (not shown) or the external device (not shown) via the switch SW1. The adder 31 following the switch SW1 combines the reproduced luminance signal and the reproduced carrier color signal into a composite television signal of the standard format such as the NTSC format. The composite television signal can be transmitted from the adder 31 to the monitoring device (not shown) or the external device (not shown).

In the prior-art apparatus of FIG. 1, during the reproduction of the luminance and color signals from the magnetic tape TP, the magnetic head 19 reproduces an audio signal from the magnetic tape TP. The audio signal processor 16 receives the reproduced audio signal from the magnetic head 19. The audio signal processor 16 amplifies the reproduced audio signal, and applies the amplification-resultant audio signal to the monitoring device (not shown) or the external device (not shown).

In the prior-art apparatus of FIG. 1, the COD camera portion 1 includes an oscillator with a quartz-crystal resonator 32 which outputs a clock signal for the readout process and the A/D conversion. The video signal processor 4 includes an oscillator with a quartz-crystal resonator 33 which outputs a clock signal. The color encoder 8 includes an oscillator with a quartz-crystal resonator 34 which outputs a color subcarrier. The color signal processor 9 includes an oscillator with a quartz-crystal resonator 35 which outputs a local oscillator signal used in the frequency down conversion and the frequency up conversion. The color signal processor 9 also includes an oscillator 36 which outputs a frequency-down- converted subcarrier (a color subcarrier in a frequency-down-converted color signal) having a frequency of, for example, 629 kHz.

The prior-art apparatus of FIG. 1 has the signal processors 7, 9, and 16 exclusively for a luminance signal, a color signal, and an audio signal respectively. In the prior-art apparatus of FIG. 1, the magnetic heads 14a, 14b, 14c, and 14d are used exclusively for a video signal while the magnetic head 19 is used exclusively for an audio signal. As previously described, the COD camera portion 1, the video signal processor 4, the color encoder 8, and the color signal processor 9 include the clock signal oscillators and the other oscillator. Accordingly, the prior-art apparatus of FIG. 1 tends to be high in cost and large in size.

In the prior-art apparatus of FIG. 1, the frequency division multiplexed signal composed of the frequency-down-converted color signal and the FM luminance signal is recorded on the magnetic tape TP. Accordingly, an interference tends to occur between the frequency-down-converted color signal and the FM luminance signal. The frequency-down-converted color signal and the audio signal are in low frequency bands, and the erasing magnetic heads 20 and 23 are activated during a recording process which involves overwriting. In the prior-art apparatus of FIG. 1, the clock signals are asynchronous with each other, and beats tend occur therebetween. The beats are liable to mix with the video signal and the audio signal recorded on the magnetic tape TP. Accordingly, the beats tend to reduce the qualities of a reproduced 5 video signal and a reproduced audio signal.

First Embodiment

An information recording and reproducing apparatus according to a first embodiment of this invention has a body on which a television camera is integrally provided.

Figure 2:
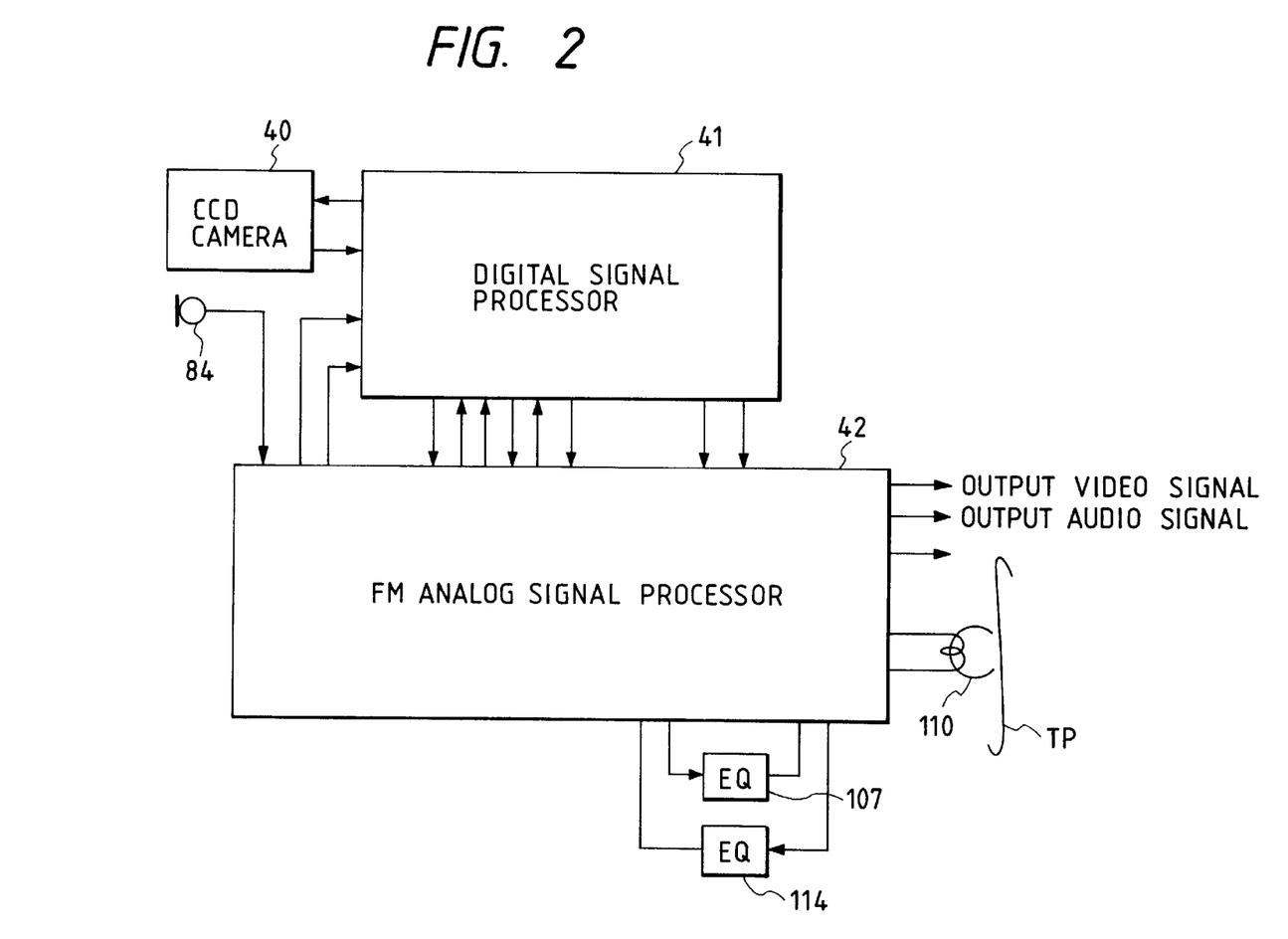
FIG. 2 is a block diagram of an information recording and reproducing apparatus according to a first embodiment of this invention.

With reference to FIG. 2, the apparatus of the first embodiment of this invention includes a CCD (charge-coupled device) camera portion 40, a digital signal processor 41, an FM (frequency modulation) analog signal processor 42, and a magnetic head 110. The CCD camera portion 40 is connected to the digital signal processor 41. The digital signal processor 41 is connected to the FM analog signal processor 42. The FM analog signal processor 42 is connected to the magnetic head 110. The FM analog signal processor 42 is also connected to a microphone 84. The digital signal processor 41 can be formed by an integrated circuit (IC) for digital signal processing. The FM analog signal processor 42 can be formed by an IC.

Figure 3:
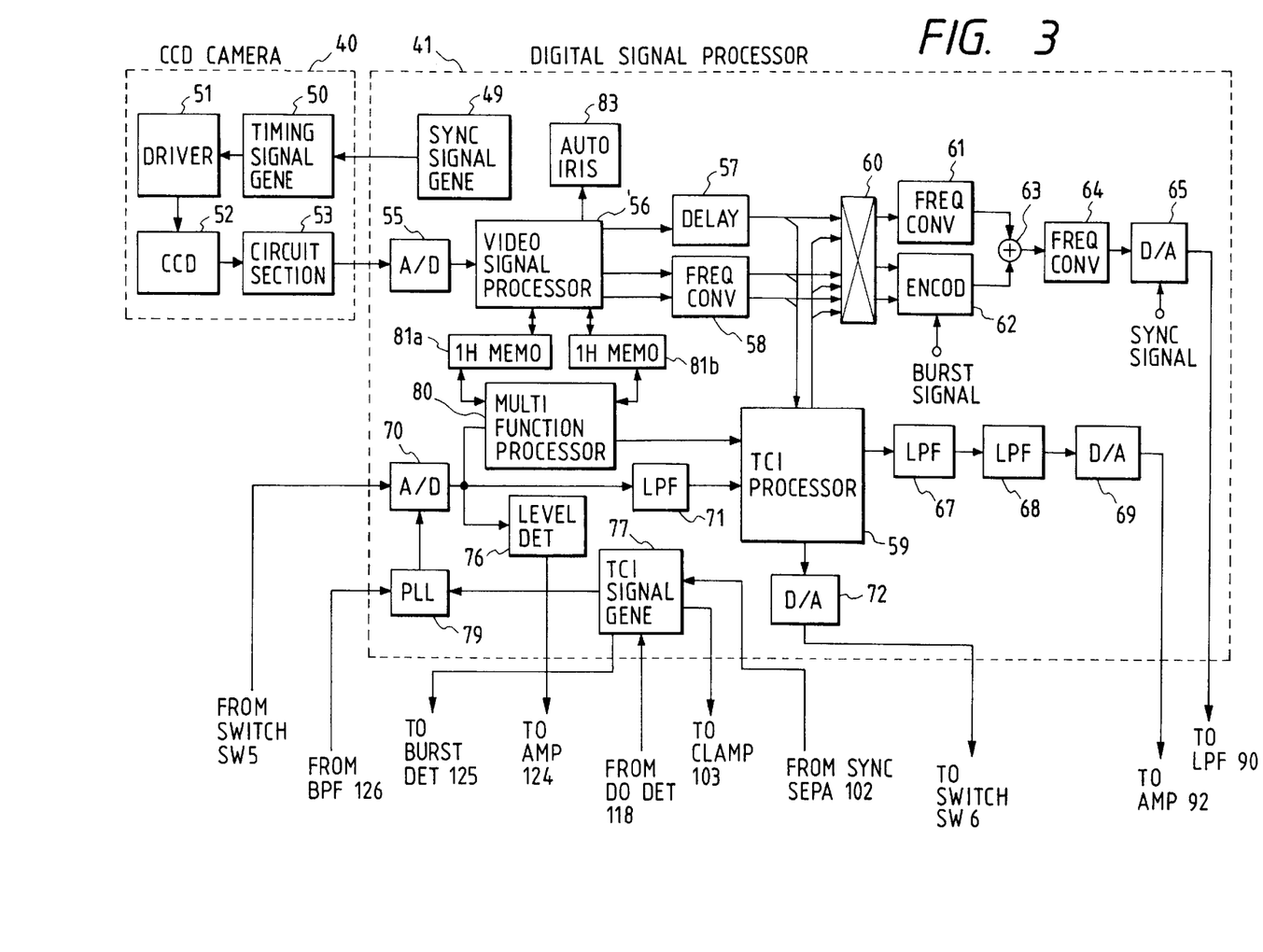
FIG. 3 is a block diagram of a CCD camera portion and a digital signal processor in FIG. 2.

As shown in FIG. 3, the CCD camera portion 40 includes a timing signal generator 50, a vertical transfer driver 51, a photosensor CCD array 52, and a circuit section 53. The circuit section 53 has a correction dual sampling circuit, a sample-and-hold circuit, and an amplifier. The timing signal generator 50 is connected to the digital signal processor 41. The timing signal generator 50 is connected to the vertical transfer driver 51. The vertical transfer driver 51 is connected to the photosensor CCD array 52. The photosensor CCD array 52 is connected to the circuit section 53. The circuit section 53 is connected to the digital signal processor 41.

The CCD camera portion 40 also includes an objective lens and an auto-focusing device. Light representing an image of an object is applied via the objective lens to the photosensor CCD array 52. The applied light is subjected to photoelectric conversion by the photosensor CCD array 52. On the other hand, the timing signal generator 50 receives a sync signal (a clock signal) from the digital signal processor 41. The device 50 generates a timing signal in response to the sync signal, and outputs the timing signal to the vertical transfer driver 51. The vertical transfer driver 51 controls the photosensor CCD array 52 in response to the timing signal. The photosensor CCD array 52 generates a picture signal representative of the applied light, and outputs the picture signal to the circuit section 53. The circuit section 53 processes the picture signal into an analog video signal, and outputs the analog video signal to the digital signal processor 41.

As shown in FIG. 3, the digital signal processor 41 includes a sync signal generator 49, the output signal of which is fed to the timing signal generator 50 in the CCD camera portion 40 as the sync signal or the clock signal. The digital signal processor 41 also includes an A/D converter 55. The A/D converter 55 receives the analog video signal from the circuit section 53 in the COD camera portion 40, and changes the analog video signal into a corresponding digital video signal.

In the digital signal processor 41, a video signal processor 56 receives the digital video signal from the A/D converter 55. The video signal processor 56 is connected to 1H memories 81a and 81b. The video signal processor 56 separates the digital video signal into a digital luminance signal (a digital Y signal) and two digital color difference signals (digital R-Y and B-Y signals) by using the 1H memories 81a and 81b. A delay circuit 57 receives the digital luminance signal from the video signal processor 56, and delays the digital luminance signal. A frequency converter 58 receives the digital color difference signals from the video signal processor 56. The frequency converter 58 subjects the digital color difference signals to frequency conversion. A TCI (time compressed integration) processor 59 receives a digital luminance signal from the delay circuit 57. The TCI processor 59 receives digital color difference signals from the frequency converter 58. Also, the TCI processor 59 receives a digital audio signal. The TCI processor 59 subjects the digital luminance signal, the digital color difference signals, and the digital audio signal to time base compression. The TCI processor 59 multiplexes and combines the compression-resultant digital luminance signal, the compression-resultant digital color difference signals, and the compression-resultant digital audio signal into a TCI signal on a time division multiplexing basis.

In the digital signal processor 41, a switch 60 receives the first digital luminance signal from the delay circuit 57. The switch 60 receives the first digital color difference signals from the frequency converter 58. The switch 60 receives a second digital luminance signal and second digital color difference signals from the TCI processor 59. The switch 60 selects one out of the set of the first digital luminance signal and the first digital color difference signals and the set of the second digital luminance signal and the second digital color difference signals. A frequency converter 61 receives the digital luminance signal selected by the switch 60. The frequency converter 61 subjects the digital luminance signal to frequency conversion. An encoder 62 receives the digital color difference signals selected by the switch 60. The encoder 62 receives a burst signal. The device 62 encodes and combines the digital color difference signals into a digital color signal while adding the burst signal thereto. An adder 63 receives a digital luminance signal from the frequency converter 61. The adder 63 receives the digital color signal from the encoder 62. The adder 63 combines the digital luminance signal and the digital color signal into a digital composite video signal. A frequency converter 64 receives the digital composite video signal from the adder 63. The frequency converter 64 subjects the digital composite video signal to frequency conversion. A D/A converter 65 receives a digital composite video signal from the frequency converter 64. The D/A converter 65 receives a sync signal. The D/A converter 65 changes the digital composite video signal into a corresponding analog composite video signal, and adds the sync signal thereto.

In the digital signal processor 41, a digital audio signal is transmitted from the TCI processor 59 to a D/A converter 69 via low pass filters 67 and 68. The low pass filter 67 has a cutoff frequency of 7 kHz. The low pass filter 68 has a cutoff frequency of 20 kHz. The low pass filters 67 and 68 prevent aliasing in connection with operation of the D/A converter 69. The D/A converter 69 receives a digital audio signal from the low pass filter 68, and changes the digital audio signal into a corresponding analog audio signal.

The digital signal processor 41 includes an A/D converter 70 receiving either an analog audio signal or a reproduced analog TCI signal. The A/D converter 70 changes the received analog signal into a corresponding digital signal in response to a sampling clock signal which can be fed from a PLL (phase locked loop) circuit 79. The digital signal is transmitted from the A/D converter 70 to the TCI processor 59 via a low pass filter 71.

In the digital signal processor 41, a D/A converter 72 receives the TCI signal from the TCI processor 59. The D/A converter 72 changes the TCI signal into a corresponding analog TCI signal. A level detector 76 receives the digital signal from the A/D converter 70. The device 76 detects a level represented by the digital signal. A TCI signal generator 77 outputs a reference timing signal to the PLL circuit 79. A multi-function processor 80 is connected to the A/D converter, the 1H memories 81a and Bib, and the TCI processor 59. The multi-function processor 80 receives the digital signal from the A/D converter 70. The multi-function processor 80 implements time base correction, line-correlation-based noise reduction, and drop-out compensation on the received digital signal by using the 1H memories 81a and 81b. An auto-iris circuit 83 is connected to the video signal processor 56.

Figure 4:
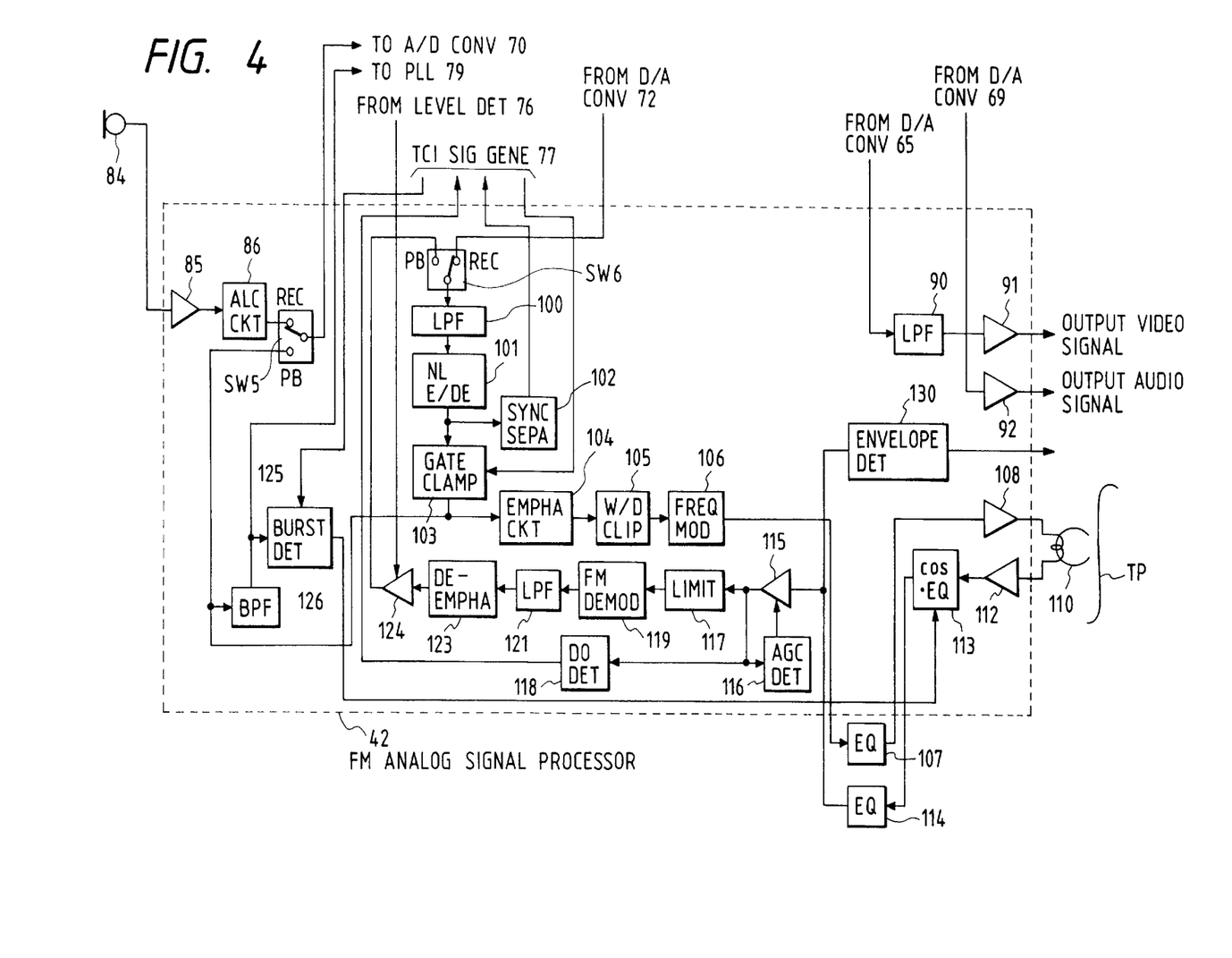
FIG. 4 is a block diagram of an FM analog signal processor in FIG. 2.

As shown in FIG. 4, the FM analog signal processor 42 includes a preamplifier 85, an ALC (automatic level control) circuit 86, and a switch SW5. The microphone 84 converts sound into a corresponding analog audio signal, which is transmitted to a first input side of the switch SW5 via the preamplifier 85 and the ALC circuit 86. The switch SW5 can be changed between a recording position (a REC position) and a playback position (a PB position). The output side of the switch SW5 is connected to the input terminal of the A/D converter 70 in the digital signal processor 41.

The FM analog signal processor 42 includes a low pass filter 90 and amplifiers 91 and 92. The input terminal of the low pass filter 90 is connected to the output terminal of the D/A converter 65 in the digital signal processor 41. The output terminal of the low pass filter 90 is connected to the input terminal of the amplifier 91. The output terminal of the amplifier 91 leads to a monitoring device (not shown). The input terminal of the amplifier 92 is connected to the output terminal of the D/A converter 69 in the digital signal processor 41. The output terminal of the amplifier 92 leads to a monitoring device (not shown).

The FM analog signal processor 42 includes a switch SW6 which can be changed between a recording position (a REC position) and a playback position (a PB position). A first input side of the switch SW6 is connected to the output terminal of the D/A converter 72 in the digital signal processor 41. In the FM analog signal processor 42, the output side of the switch SW6 is connected to the input terminal of a low pass filter 100. The output terminal of the low pass filter 100 is connected to the input terminal of a nonlinear emphasis/deemphasis circuit 101. The output terminal of the nonlinear emphasis/deemphasis circuit 101 is connected to the input terminal of a sync separator 102 and the input terminal of a gate clamp circuit 103. The output terminal of the sync separator 102 is connected to the TCI signal generator 77 in the digital signal processor 41. The gate clamp circuit 103 subjects the output signal of the nonlinear emphasis/deemphasis circuit 101 to gating and clamping in response to a control signal fed from the TCI signal generator 77 in the digital signal processor 41. The output terminal of the gate clamp circuit 103 is connected to a second input side of the switch SW5 and the input terminal of an emphasis circuit 104. The output terminal of the emphasis circuit 104 is connected to the input terminal of a white/dark clip circuit 105. The output terminal of the white/dark clip circuit 105 is connected to the input terminal of a frequency modulator 106. The output terminal of the frequency modulator 106 is connected via an equalizer 107 to the input terminal of a recording amplifier 108. The equalizer 107 is located outside the FM analog signal processor 42.

In the FM analog signal processor 42, the output terminal of a preamplifier 112 is connected to the input terminal of a cosine equalizer 113. The device 113 subjects the output signal of the preamplifier 112 to a cosine equalization process in response to a control signal fed from a burst detector 125. The output terminal of the cosine equalizer 113 is connected via an equalizer 114 to the input terminal of a voltage controlled amplifier 115 and the input terminal of an envelope detector 130. An output signal of the envelope detector 130 can be transmitted from the FM analog signal processor 42. The equalizer 114 is located outside the FM analog signal processor 42. The device 115 amplifies the output signal of the equalizer 114 at a gain adjusted by a control signal fed from an AGO (automatic gain control) detector 116. The output terminal of the voltage controlled amplifier 115 is connected to the input terminal of the AGO detector 116, the input terminal of a limiter 117, and the input terminal of a drop-out detector 118. The output terminal of the drop-out detector 118 is connected to the TCI signal generator 77. The limiter 117 is sequentially followed by an FM demodulator 119, a low pass filter 121, a Reemphasis circuit 123, and a voltage controlled amplifier 124. The device 124 amplifies the output signal of the Reemphasis circuit 123 at a gain adjusted by a control signal fed from the level detector 76 in the digital signal processor 41. The output terminal of the voltage controlled amplifier 124 is connected to a second input side of the switch SW6. The input terminal of a band pass filter 126 is connected to the output terminal of the gate clamp circuit 103. The band pass filter 126 is tuned to select a color subcarrier. The output terminal of the band pass filter 126 is connected to the input terminal of the burst detector 125. The burst detector 125 operates on the output signal of the band pass filter 126 in response to a control signal fed from the TCI signal generator 77 in the digital signal processor 41. The output terminal of the band pass filter 126 is also connected to the PLL circuit 79 in the digital signal 5 processor 41.

The output terminal of the recording amplifier 108 and the input terminal of the preamplifier 112 are connected to a magnetic head 110 via a rotary transformer (not shown). The magnetic head 110 is mounted on a rotary drum (not shown). The magnetic head 110 serves to record the output signal of the recording amplifier 108 on a magnetic tape TP. The magnetic head 110 serves to reproduce a signal from the magnetic tape TP.

Operation of the information recording and reproducing apparatus of FIGS. 2–4 can be changed between a recording mode and a playback mode. During the recording mode of operation of the apparatus, the switches SW5 and SW6 are in their REC positions. In the CCD camera portion 40, the photosensor CCD array 52 is driven by the vertical transfer driver 51 so that a picture signal representing applied light is outputted from the photosensor CCD array 52. The picture signal outputted from the photosensor CCD array 52 is processed by the circuit section 53 into an analog video signal. The A/D converter 55 in the digital signal processor 41 receives the analog video signal from the circuit section 53 in the CCD camera portion 40. The A/D converter 55 changes the analog video signal into a corresponding digital video signal in response to a sampling clock signal having a frequency equal to a color subcarrier frequency fsc (3.58 MHz in the case of the NTSC system) multiplied by a factor of 8/3. The digital video signal has, for example, 8 bits per sample. The digital video signal is fed from the A/D converter 55 to the video signal processor 56. The video 5 signal processor 56 uses the 1H memories 81a and 81b, thereby separating the digital video signal into a digital luminance signal (a digital Y signal) and two digital color difference signals (digital R-Y and B-Y signals).

During the recording mode of operation of the apparatus, the delay circuit 57 receives the digital luminance signal from the video signal processor 56. The device 57 delays the digital luminance signal for time adjustment. The delay circuit 57 outputs the delay-resultant digital luminance signal to the TCI processor 59. The frequency converter 58 receives the digital color difference signals 15 from the video signal processor 56. The device 58 frequency converts the digital color difference signals into second digital color difference signals having a sampling frequency equal to four times the color subcarrier frequency fsc. The frequency converter 58 outputs the second digital color difference signals to the TCI 20 processor 59.

During the recording mode of operation of the apparatus, the microphone 84 converts sound into a corresponding analog audio signal. The microphone 84 outputs the analog audio signal. The analog audio signal outputted from the microphone 84 is 2 5 sequentially processed by the preamplifier 85 and the ALC circuit 86 in the FM analog signal processor 42, being converted into a second analog audio signal having approximately a constant level. The constant-level analog audio signal is transmitted from the ALC circuit 86 to the A/D converter 70 in the digital signal processor 41 via the switch SW5. The A/D converter 70 changes the constant-level analog audio signal into a corresponding PCM (pulse code modulation) audio signal in response to a sampling clock signal having a frequency equal to, for example, four times the color subcarrier frequency fsc. The PCM audio signal has, for example, 8 bits per sample.

The frequency of the sampling clock signal used in the A/D converter 70 is remarkably higher than twice the upper limit of the frequency of the constant-level analog audio signal. Accordingly, over-sampling of the constant-level analog audio signal is implemented by the A/D converter 70. This design dispenses with 15 an anti-aliasing low pass filter preceding the A/D converter 70. Accordingly, it is possible to simplify the structure of the apparatus. Also, it is possible to reduce the circuit scale of the apparatus.

During the recording mode of operation of the apparatus, A/D converter 70 outputs the PCM audio signal to the low pass filter 71. The low pass filter 71 has a cutoff frequency of 7 kHz. The low pass filter 71 subjects the PCM audio signal to decimation (thinning out) at a rate fH, thereby converting the PCM audio signal into a second PCM audio signal. Here, the rate fH is equal to a horizontal scanning frequency. Thus, the second PCM audio signal is equivalent to a PCM audio signal resulting from signal sampling at a frequency equal to the horizontal scanning frequency fH. The low pass filter 71 is composed of a digital filter which uses the output signal of the sync signal generator 49 as a sampling clock signal. A timing of the sampling clock signal, that is, a timing of the decimation (the thinning out), is set within a horizontal blanking period in the readout of the picture signal from the photosensor COD array 52. Accordingly, the decimation (the thinning out) by the low pass filter 71 is prevented from interfering with the readout of the picture signal from the photosensor COD array 52. The low pass filter 71 outputs the second PCM audio signal to the TCI processor 59.

During the recording mode of operation of the apparatus, the TCI processor 59 receives the digital luminance signal from the delay circuit 57. The TCI processor 59 receives the digital color difference signals from the frequency converter 58. The TCI processor 59 receives the PCM audio signal from the low pass filter 15 71. The TCI processor 59 subjects the digital luminance signal, the digital color difference signals, and the PCM audio signal to time base compression and multiplexing, thereby combining them into a TCI signal. Specifically, a 1H-segment of the digital luminance signal, 1H-segments of the digital color difference signals, and a 20 segment of the PCM audio signal are compressed in time base so that a combination of the compression-resultant signal segments can be in a 1H interval. The digital luminance signal, the digital color difference signals, and the PCM audio signal are combined into the TCI signal on a time division multiplexing basis.

Figure 5:
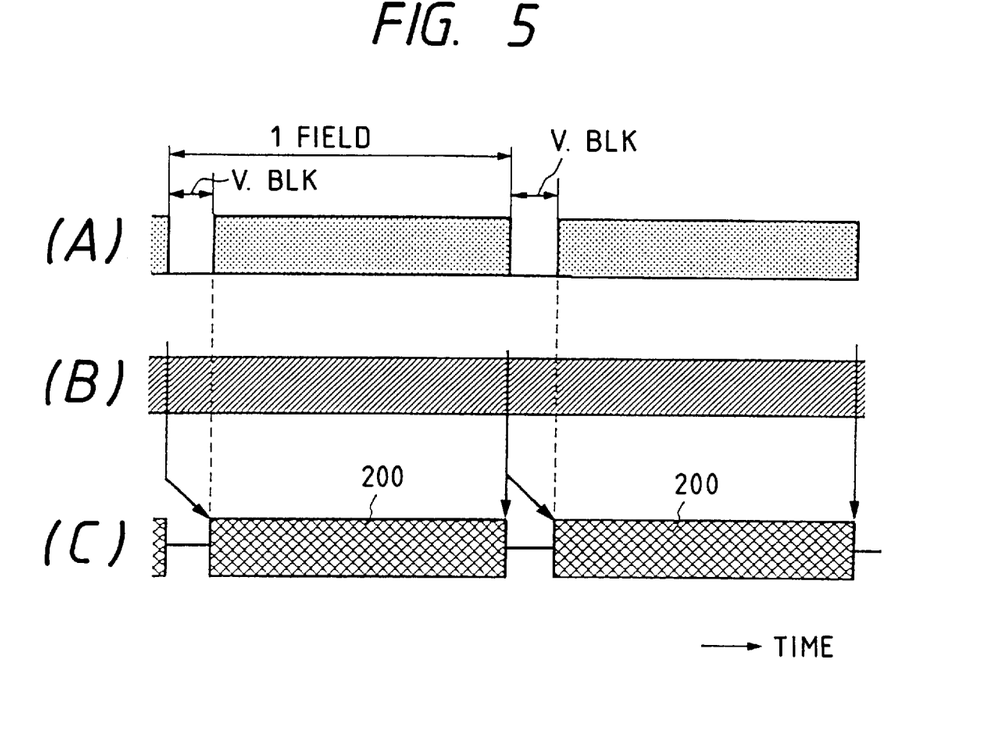
FIG. 5 is a time-domain diagram of signals in the apparatus of FIG. 2.

As shown in the portion (A) of FIG. 5, the luminance signal and the color difference signals are transmitted during intervals except vertical blanking periods V.BLK. On the other hand, as shown in the portion (B) of FIG. 5, the audio signal is continuously present. In other words, the audio signal is present in vertical blanking periods V.BLK as well as other periods. The TCI processor 59 compresses 5 the audio signal in time base for every field so that audio information in a vertical blanking period V.BLK will be moved into an effective scanning period. As shown in the portion (C) of FIG. 5, the compression-resultant audio signal has a train of effective segments 200 which occur in effective scanning periods respectively.

Although the audio signal is continuous, the TCI processor 59 handles the audio signal for every period corresponding to a field. Thus, the TCI processor 59 separates the audio signal into time segments corresponding to respective fields. In order to provide continuity of a reproduced audio signal, the TCI processor 59 implements the following processes on the audio signal. Digital data of "1" and digital data of "0" in the audio signal are converted into different levels respectively. The conversion-resultant audio signal is interposed in the TCI signal as a bit arrangement (a bit sequence). Accordingly, in the case where an analog signal resulting from D/A conversion of the TCI signal is recorded on the magnetic tape TP, the audio signal recorded on the magnetic tape TP is equivalent to a digital-version signal.

The TCI processor 59 adds a sync signal and a burst signal to a head of every 1-horizontal-line segment (1-line segment) of the TCI signal. The added sync signal and the added burst signal are used in reproducing processes. Specifically, the added sync signal is used for detecting the positions of component signals in a reproduced TCI signal. The added burst signal is used in time base correction during playback. The added burst signal is also used by AGC control in frequency adjustment during playback. The mean level of the TCI signal during every burst interval is set into agreement with a "0" level in color difference. Thus, the reproductivity of colors can be maintained by managing the level of a reproduced TCI signal occurring during every burst interval.

An example of the TCI processor 59 includes memories, data writing sections, data reading sections, and a combining section. The data writing sections periodically store the received digital luminance signal, the received digital color difference signals, and the received PCM audio signal into the respective memories. The data reading sections periodically read out the digital luminance signal, the digital color difference signals, and the PCM audio signal from the memories at different timings respectively. The frequencies of the updating of read address signals applied to the memories from the data reading sections are higher than the corresponding frequencies of the updating of write address signals applied to the memories from the data writing sections respectively so that the resultant signals outputted from the memories agree with time-base compressed versions of the digital luminance signal, the digital color difference signals, and the PCM audio signal. The combining section receives the time-base compressed versions of the digital luminance signal, the digital color difference signals, and the PCM audio signal. The combining section also receives a sync signal which occurs at a given timing. The combining section further receives a burst signal which occurs at a given timing. The combining section multiplexes the compression-resultant digital luminance signal, the compression-resultant digital color difference signals, the compression-resultant PCM audio signal, the sync signal, and the burst signal into the digital TCI signal.

Figure 6:
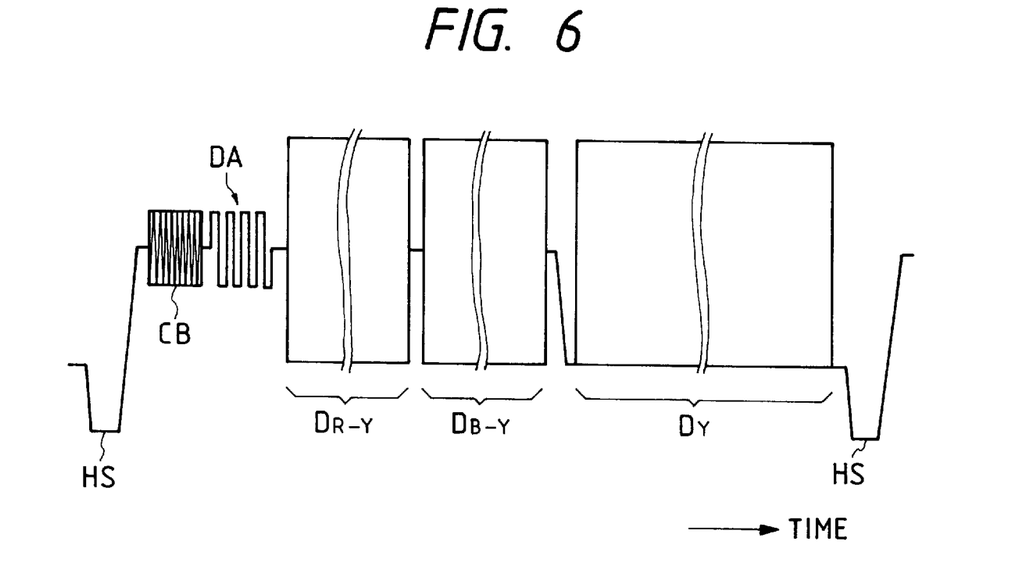
FIG. 6 is a time-domain diagram of the waveform of a 1H segment of an analog TCI signal in the apparatus of FIG. 2.

During the recording mode of operation of the apparatus, the D/A converter 72 receives the TCI signal from the TCI processor 59. The D/A converter 72 changes the TCI signal into a corresponding analog TCI signal. As shown in FIG. 6, every 1H segment of the analog TCI signal has a sequence of a horizontal sync signal HS, a burst signal CB, a compression-resultant audio signal DA, a compression-resultant color difference signal $D_{R-Y}$ (corresponding to an R-Y signal), a compression-resultant color difference signal $D_{B-Y}$ (corresponding to a B-Y signal), and a compression-resultant luminance signal $D_Y$. The analog TCI signal is transmitted from the D/A converter 72 to the nonlinear emphasis/deemphasis circuit 101 via the switch SW6 and the low pass filter 100. The nonlinear emphasis/deemphasis circuit 101 subjects the analog TCI signal to nonlinear emphasis. Then, the resultant analog TCI signal undergoes waveform processing by the gate clamp circuit 103, the emphasis circuit 104, and the white/dark clip circuit 105. The resultant analog TCI signal is inputted into the frequency modulator 106, being subjected to frequency modulation (FM). Therefore, the analog TCI signal is converted into an FM TCI signal.

During the recording mode of operation of the apparatus, the equalizer 107 receives the FM TCI signal from the frequency modulator 106. The equalizer 107 subjects the FM TCI signal to emphasis. The resultant FM TCI signal is transmitted from the equalizer 107 to the magnetic head 110 via the recording amplifier 108 and the rotary transformer (not shown). The magnetic head 110 records the FM TCI signal on the magnetic tape TP along inclined tracks (slant tracks). Accordingly, the sync signal, the burst signal, the luminance signal, the two color difference signals, and the audio signal are recorded on the magnetic tape TP by the same magnetic head 110. Any low-frequency signal is not recorded on the magnetic tape TP. Therefore, the writing of a new signal over a previously-recorded signal enables automatic erasion of the previously-recorded signal. Thus, it is unnecessary to provide an erasing magnetic head and a circuit related to the erasing magnetic head. This is advantageous in simplifying the structure of the apparatus and also reducing the cost of the apparatus.

As previously described, the magnetic head 110 is mounted on the rotary drum. The magnetic tape TP is wound on the rotary drum in an angular range less than 360 degrees. The magnetic tape TP in contact with the rotary drum extends along a helix with respect to the rotary drum. There periodically occurs an interval during which the magnetic tape TP remains not scanned by the magnetic head 110. Such a non-scanned interval is set coincident with a vertical blanking period related to the recorded signal. During a vertical blanking period in playback, a reproduced signal is replaced by a fixed-pattern signal. This process provides continuity of the reproduced signal.

During the recording mode of operation of the apparatus, signal processing for monitoring video and audio signals is executed as follows. The digital luminance signal is transmitted from the delay circuit 57 to the frequency converter 61 via the switch 60. The frequency converter 61 changes the digital luminance signal into a corresponding second digital luminance signal having a sampling frequency equal to four times the color subcarrier frequency fsc. The digital color difference signals are transmitted from the frequency converter 58 to the encoder 62 via the switch 60. The device 62 encodes and combines the digital color difference signals into a digital color signal while adding the burst signal thereto. The digital color signal is a digital carrier color signal of the standard format such as the NTSC format. The adder 63 receives the digital luminance signal from the frequency converter 61. The adder 63 receives the digital carrier color signal from the encoder 62. The adder 63 combines the digital luminance signal and the digital carrier color signal into a digital composite video signal. The frequency converter 64 receives the digital composite video signal from the adder 63. The frequency converter 64 changes the received digital composite video signal into a second digital composite video signal having a sampling frequency equal to eight times the color subcarrier frequency fsc. The D/A converter 65 receives the digital composite video signal from the frequency converter 64. The D/A converter 65 receives the sync signal. The D/A converter 65 changes the digital composite video signal into a corresponding analog composite video signal while adding the sync signal thereto. The analog composite video signal is transmitted from the D/A converter 65 to a camera finder (not shown) or a monitor (not shown) via the low pass filter 90 and the amplifier 91. The analog composite video signal is visualized by the camera finder or the monitor.

In respect of monitoring an audio signal, the TCI processor 59 transmits the digital audio signal from the low pass filter 71 to the low pass filter 67. Then, the digital audio signal is sequentially past through the low pass filters 67 and 68. As previously described, the low pass filters have cutoff frequencies of 7 kHz and 20 kHz respectively. The digital audio signal undergoes anti-aliasing while being passed through the low pass filters 67 and 68. The digital audio signal undergoes over-sampling such that the sampling frequency will change from the rate fH to a value equal to four times the color subcarrier frequency fsc. A digital audio signal which appears at the output terminal of the low pass filter 68 is applied to the D/A converter 69. The D/A converter 69 changes the applied digital audio signal into a corresponding analog audio signal in response to a sampling clock signal having a frequency equal to four times the color subcarrier frequency fsc. The analog audio signal is transmitted from the D/A converter 69 to a loudspeaker (not shown) via the amplifier 92 before being converted into corresponding sound by the loudspeaker.

As previously described, the digital audio signal undergoes over-sampling with a very high frequency (equal to four times the color subcarrier frequency fsc). Therefore, it is unnecessary to provide a low pass filter following the D/A converter 69. This is advantageous in simplifying the structure of the apparatus and also 5 reducing the circuit scale of the apparatus.

During the recording mode of operation of the apparatus, digital signal processing implemented by various devices in the digital signal processor 41 from the A/D converter 55 to the D/A converters 65 and 69 responds to the common clock signal generated by the sync signal generator 49. This design is effective in preventing beats which might occur between asynchronous clock signals. Thus, it is possible to prevent the video signal and the audio signal from being decreased in quality by such beats.

During the playback mode of operation of the apparatus, the switches SW5 and SW6 are in their PB positions while the switch 60 selects a digital luminance signal and two digital color difference signals outputted from the TCI processor 59. Inclined tracks (slant tracks) on the magnetic tape TP are scanned by the magnetic head 110, and an FM TCI signal is reproduced from the magnetic tape TP. The reproduced FM TCI signal is transmitted from the magnetic head 110 to the cosine equalizer 113 via the preamplifier 112. The device 113 subjects the reproduced FM TCI signal to the cosine equalization process in response to the output signal of the burst detector 125. The cosine equalization process is designed so that the amplitude of a burst-signal-containing segment of a TCI signal applied to the A/D converter 70 will be equal to a given level. Thus, the frequency characteristic of the reproducing circuit is automatically controlled so that the burst signal frequency will be equal to a given value.

During the playback mode of operation of the apparatus, the voltage controlled amplifier 115 receives a reproduced FM TCI signal from the cosine equalizer 113. The voltage controlled amplifier 115 and the AGO detector 116 cooperate to implement closed-loop automatic gain control of the reproduced FM TCI signal. Accordingly, the amplitude of the reproduced FM TCI signal is maintained at a constant level. The drop-out detector 118 receives the reproduced FM TCI signal from the voltage controlled amplifier 115. The device 118 detects the presence and the absence of a drop-out in the reproduced FM TCI signal. The drop-out detector 118 outputs a detection result signal to the TCI signal generator 77. The limiter 117 receives the reproduced FM TCI signal from the voltage controlled amplifier 115. The device 117 limits the amplitude or the level of the reproduced FM TCI signal. The FM demodulator 119 receives a resultant reproduced FM TCI signal from the limiter 117. The FM demodulator 119 subjects the reproduced FM TCI signal to FM demodulation, thereby demodulating the reproduced FM TCI signal into a reproduced TCI signal. The reproduced TCI signal is transmitted from the FM demodulator 119 to the A/D converter 70 via the low pass filter 121, the Reemphasis circuit 123, the voltage controlled amplifier 124, the switch SW6, the low pass filter 100, the nonlinear emphasis/deemphasis circuit 101, the gate clamp circuit 103, and the switch SW5. The A/D converter 70 changes the reproduced TCI signal into a corresponding reproduced digital TCI signal.

The gate clamp circuit 103 subjects the reproduced TCI signal to a clamping process in response to a clamp pulse signal from the TCI signal generator 77 so that a level of a sync signal in the reproduced TCI signal will be equal to a given value. This given value is determined on the basis of a reference voltage in the A/D converter 70. The level detector 76 receives the reproduced digital TCI signal from the A/D converter 70. The device 76 detects a mean value of a burst segment of the reproduced digital TCI signal, and outputs a signal representative thereof. The gain of the voltage controlled amplifier 124 is adjusted in response to the output signal of the level detector 76 so that the mean value of the burst segment of the reproduced digital TCI signal will be equal to a given value.

The reproduced TCI signal outputted from the gate clamp circuit 103 passes through the band pass filter 126. As previously described, the band pass filter 126 is tuned to the color subcarrier frequency, for example, 3.58 MHz. The burst detector 125 senses a burst signal from the output signal of the band pass filter 126. The burst detector 125 outputs the sensed burst signal to the cosine equalizer 113 as a control signal.

During the playback mode of operation of the apparatus, the PLL circuit 79 receives the output signal from the band pass filter 126. The PLL circuit 79 generates a clock signal on the basis of the output signal of the band pass filter 126. The generated clock signal is phase-synchronized with the burst signal in the reproduced TCI signal. The A/D converter 70 receives the clock signal from the PLL circuit 79. The clock signal is synchronous with a time base variation in the reproduced TCI signal. The clock signal is used by the A/D converter 70. The clock signal is used by the multi-function processor 80 for the writing of data into the 1H memories 81a and 81b. The multi-function processor 80 receives the reproduced digital TCI signal from the A/D converter 70. The multi-function processor 80 writes the reproduced digital TCI signal into the 1H memories 81a and 81b in response to the clock signal outputted from the PLL circuit 79. The reproduced digital TCI signal is temporarily stored in the 1H memories 81a and 81b.

The multi-function processor 80 reads out the reproduced digital TCI signal from the 1H memories 81a and 81b in response to a clock signal generated by using a quartz-crystal resonator (not shown). Accordingly, it is possible to suppress a time base variation in the reproduced digital TCI signal. In other words, time base correction is executed on the reproduced digital TCI signal. The multi-function processor 80 executes line-correlation-based noise reduction and drop-out compensation on the reproduced digital TCI signal by using 1H-preceding information pieces read out from the 1H memories 81*a* and 81*b*. Accordingly, the 1H memories 81*a* and 81*b* are used in both the recording mode and the playback mode of operation of the apparatus. This is advantageous in simplifying the structure of the apparatus and also reducing the circuit scale of the apparatus.

During the playback mode operation of the apparatus, the TCI processor 59 receives the reproduced digital TCI signal from the multi-function processor 80. The TCI processor 59 includes a signal generator or a PLL circuit which detects a sync signal in the reproduced TCI signal, and which generates a switching pulse signal on the basis of the detected sync signal. The TCI processor 59 includes a demultiplexer responsive to the switching pulse signal which sequentially separates a compression-resultant digital luminance signal, compression-resultant digital color difference signals, and a compression-resultant digital audio signal from the reproduced digital TCI signal. The TCI processor 59 includes memories into which the compression-resultant digital luminance signal, the compression-resultant digital color difference signals, and the compression-resultant digital audio signal are written in response to write clock signals. The digital luminance signal, the digital color difference signals, and the digital audio signal are read out from the memories in response to read clock signals. The write clock signals and the read clock signals have a given frequency relation with each other so that the compression-resultant digital luminance signal, the compression-resultant digital color difference signals, and the compression-resultant digital audio signal are expanded into a digital luminance signal, digital color difference signals, and a digital audio signal having time bases equal to the original time bases. The time base expansion of the digital luminance signal and the digital color difference signals is executed line by line. As previously described, audio information in a vertical blanking period V.BLK is compressed into an effective scanning period. Thus, the time base expansion of the digital audio signal is executed field by field.

During the playback mode of operation of the apparatus, the digital luminance signal is transmitted from the TCI processor 59 to the frequency converter 61 via the switch 60. The frequency converter 61 changes the digital luminance signal into a corresponding second digital luminance signal having a sampling frequency equal to four times the color subcarrier frequency fsc. The digital color difference signals are transmitted from the TCI processor 59 to the encoder 62 via the switch 60. The device 62 encodes and combines the digital color difference signals into a digital color signal while adding the burst signal thereto. The digital color signal is a digital carrier color signal of the standard format such as the NTSC format. The adder 63 receives the digital luminance signal from the frequency converter 61. The adder 63 receives the digital carrier color signal from the encoder 62. The adder 63 combines the digital luminance signal and the digital carrier color signal into a digital composite video signal. The frequency converter 64 receives the digital composite video signal from the adder 63. The frequency converter 64 changes the received digital composite video signal into a second digital composite video signal having a sampling frequency equal to eight times the color subcarrier frequency fsc. The D/A converter 65 receives the digital composite video signal from the frequency converter 64. The D/A converter 65 receives the sync signal. The D/A converter 65 changes the digital composite video signal into a corresponding analog composite video signal while adding the sync signal thereto. The analog composite video signal is transmitted from the D/A converter 65 to the camera finder (not shown) or the monitor (not shown) via the low pass filter 90 and the amplifier 91. The analog composite video signal is visualized by the camera finder or the monitor. The analog composite video signal may be outputted to an external device (not shown). In this case, the analog composite video signal is visualized by the external device.

During the playback mode of operation of the apparatus, the digital audio signal is outputted from the TCI processor 59 before being sequentially past through the low pass filters 67 and 68. As previously described, the low pass filters have cutoff frequencies of 7 kHz and 20 kHz respectively. The digital audio signal undergoes anti-aliasing while being passed through the low pass filters 67 and 68. The digital audio signal undergoes over-sampling such that the sampling frequency will change from the rate fH to a value equal to four times the color subcarrier frequency fsc. A digital audio signal which appears at the output terminal of the low pass filter 68 is applied to the D/A converter 69. The D/A converter 69 changes the applied digital audio signal into a corresponding analog audio signal in response to the sampling clock signal having a frequency equal to four times the color subcarrier frequency. The analog audio signal is transmitted from the D/A converter 69 to the loudspeaker (not shown) via the amplifier 92 before being converted into corresponding sound by the loudspeaker. The analog audio signal may be outputted to an external device (not shown). In this case, the analog audio signal is converted into corresponding sound by the external device.

It should be noted that the single magnetic head 110 may be replaced by two magnetic heads on a rotary drum which implement signal recording and reproduction with two channels. In this case, guard-band-less recording can be executed, and the cost of the apparatus can be reduced. Also, it is unnecessary to provide a memory for storing an audio signal which occurs during a vertical blanking period. Further, even when the magnetic heads can not accurately trace recording tracks on a magnetic tape, it is unnecessary to erase a previously-recorded signal. In addition, even-numbered fields can be discriminated from odd-numbered fields in response to a symmetrical rectangular waveform signal synchronized with rotation of the rotary drum.

Second Embodiment

Figure 7:
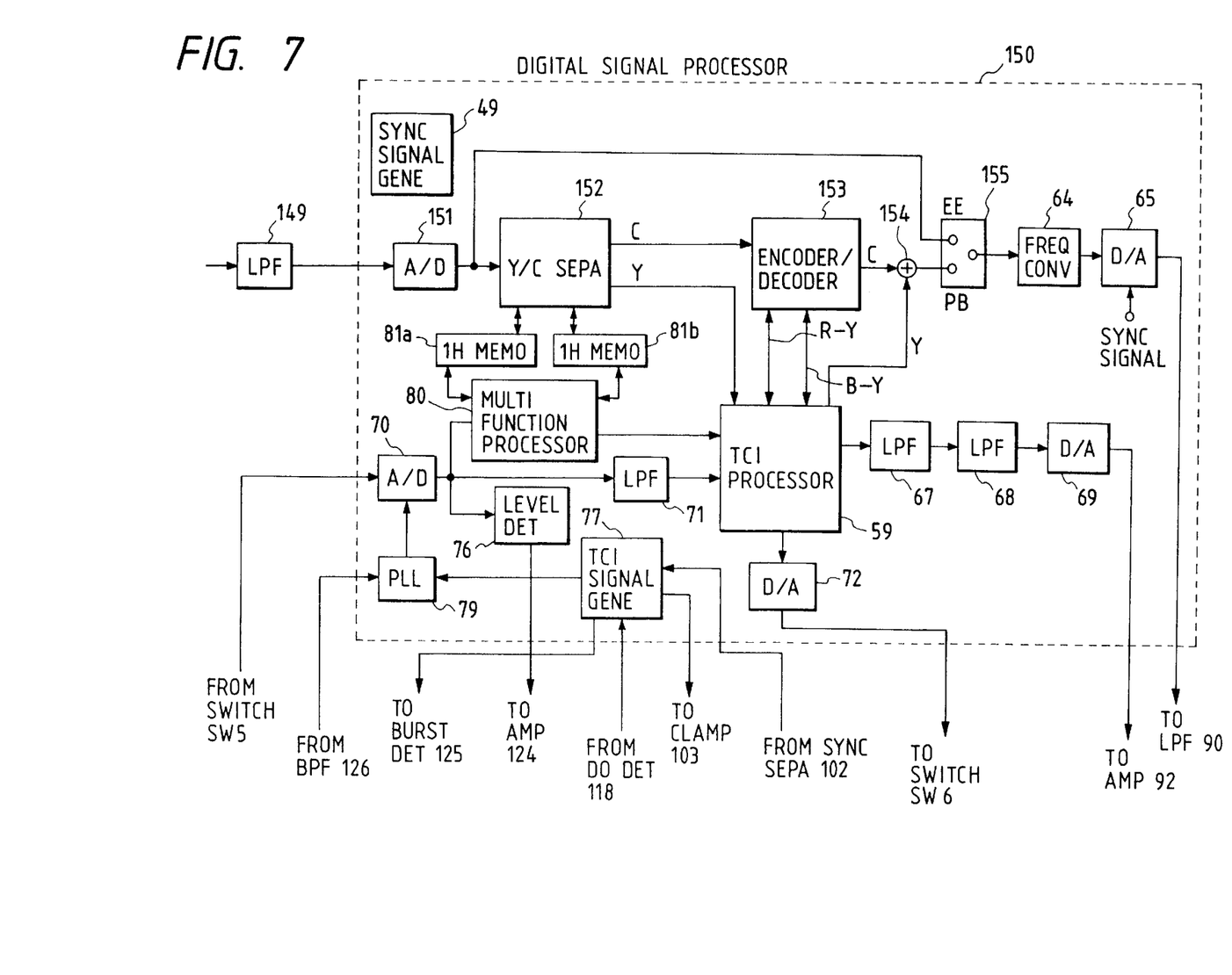
FIG. 7 is a block diagram of a digital signal processor in an information recording and reproducing apparatus according to a second embodiment of this invention.

A second embodiment of this invention is similar to the embodiment of FIGS. 2–4 except for design changes indicated later. The second embodiment of this invention is directed to an information recording and reproducing apparatus devoid of a camera. FIG. 7 shows a part of the apparatus according to the second embodiment of this invention. The apparatus of the second embodiment of this invention includes a digital signal processor 150 instead of the digital signal processor 41 (see FIG. 3). The digital signal processor 150 is a modification of the digital signal processor 41.

With reference to FIG. 7, the digital signal processor 150 includes a Y/C separator 152 instead of the video signal processor 56, the delay circuit 57, the frequency converter 58, the switch 60, and the frequency converter 61 (see FIG. 3). The digital signal processor 150 includes an encoder/decoder 153 instead of the encoder 62 (see FIG. 3). The digital signal processor 150 includes an A/D converter 151 instead of the A/D converter 55 (see FIG. 3). The A/D converter 151 follows a low pass filter 149. The digital signal processor 150 also includes an adder 154 and a switch 155. The digital signal processor 150 is devoid of the auto-iris circuit 83 (see FIG. 3). The switch 155 can be changed between an EE position and a PB position.

During a recording mode of operation of the apparatus of FIG. 7, an analog composite video signal is fed via the low pass filter 149 to the A/D converter 151. The low pass filter 149 prevents aliasing 15 in connection with operation of the A/D converter 151. The A/D converter 151 changes the analog composite video signal into a corresponding digital composite video signal in response to a sampling clock signal having a frequency equal to, for example, four times the color subcarrier frequency fsc. The digital composite video signal has, for example, 8 bits per sample. An A/D converter 70 receives an analog audio signal via a switch SW5 (see FIG. 4).

During the recording mode of operation of the apparatus, the Y/C separator 152 receives the digital composite video signal from the A/D converter 151. The Y/C separator 152 divides the digital composite video signal into a digital luminance signal (a digital Y signal) and a digital carrier color signal (a digital C signal) by using 1H memories 81a and 81b. A TCI processor 59 receives the digital luminance signal from the Y/C separator 152. The encoder/decoder 153 receives the digital carrier color signal from the Y/C separator 152. The encoder/decoder 153 separates the digital carrier color signal into two digital color difference signals (digital R-Y and B-Y signals). The TCI processor 59 receives the digital color difference signals from the encoder/decoder 153. On the other hand, the A/D converter 70 changes the analog audio signal into a corresponding digital audio signal. The digital audio signal is transmitted from the A/D converter 70 to the TCI processor 59 via a low pass filter 71. The TCI processor 59 multiplexes and combines the digital luminance signal, the digital color difference signals, and the digital audio signal into a digital TCI signal. The analog version of the TCI signal is recorded on a magnetic tape along inclined tracks (slant tracks) as in the embodiment of FIGS. 2–4.

During the recording mode of operation of the apparatus, the switch 155 is generally in its EE position so that the digital composite video signal is transmitted from the A/D converter 151 to the frequency converter 64 via the switch 155. Therefore, the composite video signal can be visualized by a monitoring device as in the embodiment of FIGS. 2–4. The TCI processor 59 transmits the digital audio signal from the low pass filter 71 to a low pass filter 67. Therefore, the digital audio signal can be converted into corresponding sound by a monitoring device as in the embodiment of FIGS. 2–4.

During a playback mode of operation of the apparatus, the switch 155 is in its PB position. The TCI processor 59 separates a reproduced digital TCI signal into a digital luminance signal (a digital Y signal), two digital color difference signals (digital R-Y and B-Y signals), and a digital audio signal. The encoder/decoder 153 receives the digital color difference signals from the TCI processor 59. The encoder/decoder 153 combines the digital color difference signal into a digital carrier color signal (a digital C signal). The adder 154 receives the digital carrier color signal from the encoder/decoder 153. Also, the adder 154 receives the digital luminance signal from the TCI processor 59. The adder 154 combines the digital carrier color signal and the digital luminance signal into a digital composite video signal (a reproduced composite video signal). The digital composite video signal (the reproduced composite video signal) is transmitted from the adder 154 to the frequency converter 64 via the switch 155. Therefore, the reproduced composite video signal can be visualized by the monitoring device as in the embodiment of FIGS. 2–4. The low pass filter 67 receives the digital audio signal (the reproduced audio signal) from the TCI processor 59. Therefore, the reproduced audio signal can be converted into corresponding sound by the monitoring device as in the embodiment of FIGS. 2–4.

Third Embodiment

A third embodiment of this invention is similar to the embodiment of FIGS. 2–4 except for design changes indicated later. The third embodiment of this invention is directed to an information recording apparatus having a body on which a television camera is integrally provided.

The apparatus of the third embodiment of this invention includes a digital signal processor devoid of the switch 60, the frequency converter 61, the encoder 62, the adder 63, the frequency converter 64, the D/A converter 65, the low pass filters 67 and 68, the D/A converter 69, the level detector 76, the PLL circuit 79, and the multi-function processor 80 (see FIG. 3).

The apparatus of the third embodiment of this invention includes a COD camera portion 40 (see FIGS. 2 and 3). The apparatus of the third embodiment of this invention also includes an FM analog signal processor having a preamplifier 85, an ALC circuit 86, a low pass filter 100, a gate clamp circuit 103, an emphasis circuit 104, a white/dark clip circuit 105, a frequency modulator 106, a recording amplifier 108, and a nonlinear emphasis circuit (see FIG. 4). The nonlinear emphasis circuit replaces the nonlinear emphasis/deemphasis circuit 101 (see FIG. 4). Further, the apparatus of the third embodiment of this invention includes an equalizer 107, a magnetic head 110, and a microphone 84 (see FIG. 4).

Fourth Embodiment

A fourth embodiment of this invention is similar to the embodiment of FIG. 7 except for design changes indicated later. The fourth embodiment of this invention is directed to an information recording apparatus devoid of a camera.

The apparatus of the fourth embodiment of this invention includes a digital signal processor devoid of the adder 154, the switch 155, the frequency converter 64, the D/A converter 65, the low pass filters 67 and 68, the D/A converter 69, the level detector 76, the PLL circuit 79, and the multi-function processor 80 (see FIG. 7). The digital signal processor includes a decoder instead of the encoder/decoder 153 (see FIG. 7).

The apparatus of the fourth embodiment of this invention also includes an FM analog signal processor having an ALC circuit 86, a low pass filter 100, a gate clamp circuit 103, an emphasis circuit 104, a white/dark clip circuit 105, a frequency modulator 106, a recording amplifier 108, and a nonlinear emphasis circuit (see FIG. 4). The nonlinear emphasis circuit replaces the nonlinear emphasis/deemphasis circuit 101 (see FIG. 4). Further, the apparatus of the fourth embodiment of this invention includes an equalizer 107 and a magnetic head 110 (see FIG. 4).

Fifth Embodiment

A fifth embodiment of this invention is similar to the embodiment of FIGS. 2–4 except for design changes indicated later. The fifth embodiment of this invention is directed to an information reproducing apparatus.

The apparatus of the fifth embodiment of this invention includes a digital signal processor having a TCI processor 59, a frequency converter 61, an encoder 62, an adder 63, a frequency converter 64, a D/A converter 65, low pass filters 67 and 68, a D/A converter 69, an A/D converter 70, a level detector 76, a TCI signal generator 77, a PLL circuit 79, a multi-function processor 80, and 1H memories 81a and 81b (see FIG. 3).

The apparatus of the fifth embodiment of this invention includes an FM analog signal processor having a low pass filters 90 and 100, amplifiers 91 and 92, sync separator 102, a gate clamp circuit 103, a preamplifier 112, a cosine equalizer 113, a voltage 5 controlled amplifier 115, an AGC detector 116, a limiter 117, a drop-out detector 118, an FM demodulator 119, a low pass filter 121, a Reemphasis circuit 123, a voltage controlled amplifier 124, a burst detector 125, a band pass filter 126, and an envelope detector 130 (see FIG. 4). The FM analog signal processor includes a nonlinear Reemphasis circuit instead of the nonlinear emphasis/deemphasis circuit 101 (see FIG. 4). The apparatus of the fifth embodiment of this invention further includes an equalizer 114 and a magnetic head 110 (see FIG. 4).

What is claimed is:

1. A recording and reproducing apparatus having a body on which a camera is integrally provided, the camera having a solid-state imager and converting a scene of an object into a corresponding video signal, the apparatus comprising:

a first A/D converter for converting the video signal generated by the camera into a corresponding digital video signal;

a first signal processor including a first memory and separating the digital video signal generated by the first A/D converter into a digital luminance signal and digital color difference signals by using the first memory;

a microphone converting sound into a corresponding audio signal;

a switch selecting one out of a reproduced signal and the audio signal generated by the microphone, and outputting the selected signal;

a second A/D converter for converting the output signal of the switch into a corresponding digital signal in response to a sampling clock signal having a frequency equal to or higher than twice a maximum frequency of a video signal;

a filter for decimating the digital signal generated by the second A/D converter;

a second signal processor including a second memory and subjecting the digital signal generated by the second A/D converter to time-base variation correction and noise reduction by using the second memory when the digital signal generated by the second A/D converter represents a reproduced signal;

a clock signal generator producing a clock signal on the basis of a reproduced signal and feeding the produced clock signal to the second A/D converter as the sampling clock signal during playback, the produced clock signal being synchronous with a time-base variation in the reproduced signal, the clock signal generator feeding the produced clock signal to the second memory as a write clock signal;

a third signal processor for time-base-compressing the digital luminance signal and the digital color difference signals generated by the first signal processor into a compression-resultant luminance signal and compression-resultant color difference signals, for time-base-compressing a digital audio signal outputted from the filter into a compression-resultant audio signal, and for multiplexing a sync signal, the compression-resultant luminance signal, the compression-resultant color difference signals, and the compression-resultant audio signal into a multiplexing-resultant signal on a time-division-multiplexing basis during recording, wherein the compression-resultant luminance signal, the compression-resultant color difference signals, and the compression-resultant audio signal are present in periods except horizontal and vertical blanking periods while the sync signal is present in the horizontal and vertical blanking periods;

the third signal processor being operative for detecting a sync signal in a reproduced multiplexing-resultant signal fed via the second signal processor, for separating a compression-resultant luminance signal, compression-resultant color difference signals, and a compression-resultant audio signal from the reproduced multiplexing-resultant signal in response to the detected sync signal, and for expanding the separated compression-resultant luminance signal, the separated compression-resultant color difference signals, and the separated compression-resultant audio signal into a recovered digital luminance signal, recovered digital color difference signals, and a recovered digital audio signal respectively during playback;

a D/A converter for converting the multiplexing-resultant signal generated by the third signal processor into a corresponding digital multiplexing-resultant signal;

a modulator subjecting the digital multiplexing-resultant signal generated by the D/A converter to modulation to convert the digital multiplexing-resultant signal into a corresponding modulation-resultant signal;

first means for recording the modulation-resultant signal generated by the modulator on a magnetic tape along inclined tracks;

second means for reproducing the modulation-resultant signal from the magnetic tape;

a demodulator for demodulating the modulation-resultant signal reproduced by the second means into a reproduced signal, and for outputting the reproduced signal to the clock signal generator and the switch;

an encoder encoding the recovered digital color difference signals generated by the third signal processor into a carrier color signal;

third means for generating a reproduced composite video signal from the recovered digital luminance signal generated by the third signal processor and the carrier color signal generated by the encoder; and fourth means for generating a reproduced audio signal from the recovered digital audio signal generated by the third signal processor.

2. A recording and reproducing apparatus as recited in claim 1, further comprising a second clock signal generator for producing clock signals synchronous with each other, wherein the first A/D converter, the second A/D converter, the filter, the D/A converter, the first signal processor, the encoder, and the first means respond to the respective clock signals produced by the second clock signal generator.

3. A recording and reproducing apparatus as recited in claim 1, wherein the first means and the second means comprise a rotary drum, and a single common magnetic head mounted on the rotary drum, the magnetic tape being wound on the rotary drum in an angular range less than 360 degrees, wherein the modulation-resultant signal applied to the magnetic head corresponds to a vertical blanking period when the magnetic head does not scans the magnetic tape, and wherein the second means replaces the reproduced modulation-resultant signal by a given signal during a vertical blanking period.

4. A recording and reproducing apparatus as recited in claim 1, wherein the third signal processor superimposes a burst signal on the multiplexing-resultant signal, and the burst signal is present in the horizontal and vertical blanking periods; and further comprising a second filter for separating a burst signal from the reproduced signal generated by the demodulator and feeding the separated burst signal to the clock signal generator, and fifth means for maintaining an amplitude of the burst signal separated by the second filter at a given amplitude.

5. A recording and reproducing apparatus as recited in claim 1, wherein said decimating by the filter has a period equal to a horizontal readout period in the solid-state imager, and a sampling timing of said decimating is in a horizontal blanking period during readout operation of the solid-state imager.

6. A recording and reproducing apparatus as recited in claim 1, wherein the first memory and the second memory comprise a common memory.

* * * * *